W. D. FERRIS.
DOOR HANGER.
APPLICATION FILED MAY 6, 1907.
940,307. Patented Nov. 16, 1909.
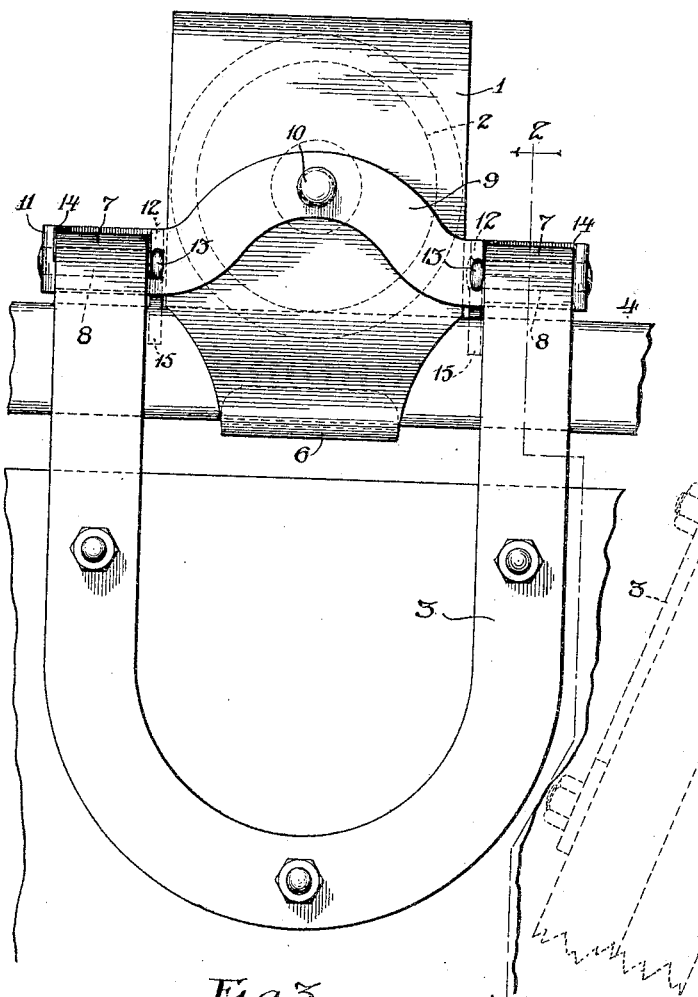
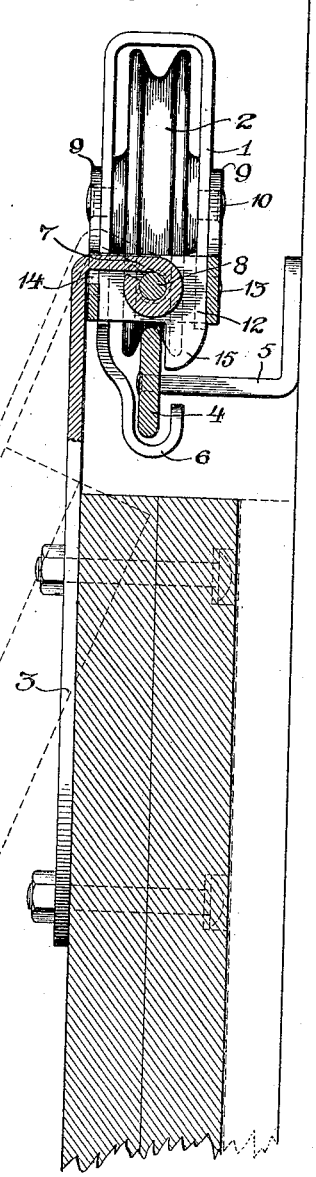
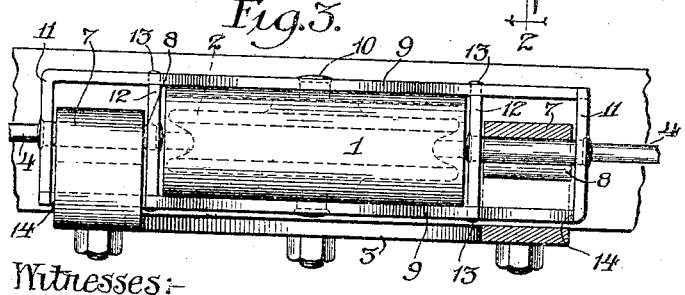
Witnesses:-
Frank W. Brown
Louis G. Hollihead
Inventor:-
William D. Ferris
By:- Peirce & Fisher
Attys.

UNITED STATES PATENT OFFICE.

WILLIAM D. FERRIS, OF STERLING, ILLINOIS.

DOOR-HANGER.

940,307.   Specification of Letters Patent.   Patented Nov. 16, 1909.

Application filed May 6, 1907. Serial No. 372,092.

*To all whom it may concern:*

Be it known that I, WILLIAM D. FERRIS, a citizen of the United States, and a resident of Sterling, county of Whiteside and State of Illinois, have invented certain new and useful Improvements in Door-Hangers, of which the following is a specification.

The invention relates to door hangers such as are commonly used for barn doors and the like, and seeks to provide an improved form in which the door strap or bracket is hinged to the wheel frame or casing and in which the tendency of the wheel to cant and the friction of the wheel upon the rail, is reduced to a minimum.

The invention consists in the features of construction, combinations and arrangements of parts hereinafter set forth, illustrated in the accompanying drawings, and more particularly pointed out in the appended claims.

In the drawings, Figure 1 is a view in elevation of the improved hanger. Fig. 2 is a section on line 2—2 of Fig. 1. Fig. 3 is a plan view of a portion of the door strap shown in section.

The improved hanger is preferably formed of sheet metal and comprises a wheel casing or hood 1 having a track wheel 2 mounted therein and a door strap or bracket 3 which is secured to the upper edge of the door and hinged to the wheel frame so that the door may be swung outwardly, as indicated in dotted lines in Fig. 2. The wheel 2 is flanged as shown, and is arranged to run upon a suitable track 4 that is carried on brackets 5 fixed to the frame of the building.

In hinged door hangers of this sort, the wheel and wheel frame tend to cant over to one side or the other, thus increasing the frictional contact between the flanges of the wheel and the track.

One object of the present invention is to mount the door strap or bracket 3 so that the tendency of the wheel to cant over is reduced to a minimum and so that the friction between the flanges of the wheel and the track is correspondingly reduced. This object is attained by hinging the door strap or bracket to the wheel frame or supporting means at a point in line with and closely adjacent the tread surface of the track 4. That is, in line with and closely adjacent the point of contact between the wheel and the track so that the entire weight of the door is hung from this point. The wheel of course, tends to cant or turn in one direction or another about the point of contact between the wheel and the track, and by pivoting or hinging the door bracket as closely adjacent this point as possible this tendency of the wheel to cant is largely overcome or reduced to a minimum. So also, the friction between the flanges of the wheel and the track due to the canting of the wheel, is obviated or reduced to a minimum.

In the particular form of the invention set forth, the hood or casing 1 is formed of sheet metal, is substantially of inverted U-shape, as shown, and the forward part is provided with a depending guard hook 6 which extends downwardly on the outer side of the rail 4 and engages the lower edge thereof. The door strap 3 is preferably of U-shape, as shown, and comprises side arms having inwardly bent or offset portions 7 at their upper ends which engage the pintles 8. These pintles are arranged in line with the central planes of the track wheel and track and closely adjacent the tread surface or point of contact between the wheel and track. The pintles are conveniently supported in this position by a frame comprising side bars or straps 9 which are preferably hung from the ends of the wheel axle 10 and arranged outside of the hood or casing 1, as shown. The side bars 9 are centrally mounted upon the wheel axle 10 and the end portions thereof depend therefrom and extend outwardly beyond the side edges of the hood or casing 1 and closely adjacent the upper edge or tread surface of the track 4. The ends of the side bars 9 are connected by cross pieces 11 to form a rectangular frame. The side bars 9 and end pieces 11 may, if desired, be formed of a single strip or bar of metal. At points adjacent the side edges of the hood or casing 1, the side bars 9 are connected by cross pieces 12 having projecting tenons or lugs 13 that extend through openings in the side bars and are upset or riveted over, as shown. The pintles 8 are supported between the end bars 11 and cross supports 12 and the eyes on the offset portion 7 of the door strap or bracket engages the pintles between the pintle supports 11 and 12. As shown, the pintles preferably extend through the pintle supports 11 and 12 and are upset or riveted thereto. By mounting the pintles in this manner, the door bracket may be hinged to and the entire weight of the door supported from a point above and closely adjacent the tread surface of the track 4 and in line with the central plane thereof, so that when the door is in normal position, there is little or no tendency for the wheel to cant and thus bind upon the track.

The front pintle supporting bar 9 is preferably cut away or notched opposite the upper ends of the side bars of the door strap or bracket, as indicated at 14, and the offset portions 7 extend inwardly through these notches, as shown.

The cross pieces 12 are provided with lugs 15 which extend downwardly on the inner side of the track 4. These lugs are spaced somewhat apart at opposite ends of the hanger, as indicated in Fig. 1, and extend downwardly on the inner side of the track while the central guard hook 6 extends downwardly on the outer side of the track and engages the lower edge thereof. When the door is swung outwardly the lugs 15 limit the outward movement or canting of the wheel and its frame or support, while the guard hook 6 limits the inward swing or canting of these parts by coming into contact with the track. Whenever the door is to be shifted longitudinally on the track it is of course returned to the normal position shown in Fig. 2 when the wheel is held upright with the lugs 15 and hook 6 out of contact with the track 1. In this position, as stated, the peculiar manner of mounting the door bracket overcomes any tendency of the wheel to cant one way or the other and thus reduces the friction between the wheel and track to a minimum.

It should be noted that the groove of the track wheel 2 is flaring or V-shaped, and is considerably wider than the track 4, so that the flanges of the wheel on opposite sides of the groove overlap the upper edge of the rail to hold the wheel on the track, but, inasmuch as the wheel is normally held in vertical position by the peculiar manner of connecting the door bracket thereto, the flanges of the wheel will not contact with the track, so that friction between the flanges of the wheel and the track is avoided.

It is obvious that changes may be made in the details of structure set forth without departure from the essentials of the invention as defined in the claims.

Having described my invention, what I claim as new and desire to secure by Letters Patent, is:—

1. A door hanger comprising a frame, a track wheel journaled therein and a door strap hinged to said frame adjacent the lower edge of said wheel and in line with the central vertical plane thereof, substantially as described.

2. A door hanger comprising a frame, a track wheel journaled therein and a door strap hinged to said frame between the axle and lower edge of said wheel and in line with the central vertical plane thereof, substantially as described.

3. In a door hanger, the combination with a track, of a track wheel, a frame wherein said wheel is journaled and a depending door bracket hinged to said frame between said track and the axle of said wheel and in line with the central vertical plane of said track and track wheel, substantially as described.

4. In a door hanger, the combination with a track, of a single, grooved, track wheel mounted on said track, the groove of said wheel being V-shaped and wider than said track, a frame centrally mounted on the axle of said wheel, a door bracket hinged to said frame above the track and below the axle of the wheel and in line with the central, vertical plane of said wheel track and guard lugs fixed to said frame and coöperating with said track to prevent the displacement of said track wheel, substantially as described.

5. In a door hanger, the combination with a track, of a single, grooved wheel mounted on said track, the groove of said wheel being V-shaped and wider than said track, a frame centrally mounted on the axle of said wheel and having downwardly and outwardly inclined end portions, said end portions having longitudinally extending pintles arranged closely adjacent the contacting tread surfaces of said track and said wheel and in line with a vertical plane extending centrally through the contacting portions of said track and wheel, and a door bracket hinged to said pintles, said frame having a guard lug extending downwardly and bent around the lower edge of said track, substantially as described.

6. A door hanger comprising a single grooved track wheel, a rectangular frame centrally mounted on the axis of said wheel and having downwardly and outwardly inclined end portions extending beyond the sides of said wheel, longitudinally extending pintles on the projecting end portions of said frame arranged in line with said wheel below the axis thereof and above and closely adjacent the tread surface of said wheel, a door bracket having inwardly offset upper ends bent around and directly hinged to said pintles, and a guard lug depending from said frame and arranged to extend around the lower edge of the track to prevent the displacement of the wheel therefrom, substantially as described.

7. A door hanger comprising a rectangular frame having depending end portions, a track wheel journaled in the central part of said frame on a transverse axis, said frame having a pair of supports at each end and longitudinally extending pintles each fixed at its ends to one pair of said supports and a door bracket comprising side arms having offset upper ends engaging said pintles between said pairs of pintle supports, substantially as described.

8. A door-hanger comprising an inverted U-shaped hood, a track wheel journaled in said hood, a separate frame comprising front and rear bars mounted on the opposite ends of the axle of said wheel and projecting beyond the side edges of said hood, the projecting ends of said bars being connected, and a door bracket hinged to the projecting ends of said bars, substantially as described.

9. A door hanger comprising an inverted U-shaped hood, a track wheel journaled in said hood, a separate frame centrally mounted on the axle of said wheel and projecting laterally beyond the side edges of said hood and a door bracket comprising side arms hinged to the projecting ends of said frame, substantially as described.

10. A door hanger comprising an inverted U-shaped hood, a track wheel journaled in said hood, a rectangular frame centrally mounted on the axle of said wheel outside of said hood and having depending end portions projecting beyond the side edges of said hood, the projecting end portions of said frame each having a pair of pintle supports and longitudinally extending pintles arranged between the pairs of supports and a door bracket comprising side arms having offset upper ends engaging said pintles between said pairs of pintle supports, substantially as described.

11. A door-hanger comprising a track wheel, an inverted U-shaped hood mounted upon the axle of said wheel and extending over the same, a pair of pintle supporting bars centrally mounted upon the opposite ends of the wheel axle and projecting beyond the side edges of said hood, the projecting ends of said bars being connected, pintles mounted on the projecting ends of said bars, and a door-strap having end portions engaging said pintles, substantially as described.

12. In a door-hanger, the combination with a track, of a track wheel, an inverted U-shaped hood mounted upon the axle of said wheel and extending over the same, a rectangular frame comprising front and rear bars centrally mounted upon the axle of said wheel and having downwardly and outwardly inclined end portions extending beyond the side edges of said wheel and connected together, longitudinally extending pintles mounted upon the projecting end portions of said bars, said pintles being arranged above and closely adjacent said track and in line with said track wheel and below the axis thereof, and a door-bracket hinged to said pintles, the front of said hood being extended downwardly in front of said track and bent upwardly behind the same to form a guard hook, substantially as described.

13. A door hanger comprising a rectangular frame formed of front and rear bars, said frame having a pair of transverse pintle supports at each end, said pintle supports connecting the ends of said front and rear bars, a track wheel journaled upon a transverse axis between said front and rear bars and between the inner pintle supports, a pair of longitudinally extending pintles, one arranged between each pair of pintle supports, a door bracket comprising side arms having offset upper ends engaging said pintles between said pairs of pintle supports, and an inverted U-shaped hood arranged between the front and rear bars and between the inner pintle supports of said frame, said hood having a depending portion forming a guard hook arranged to extend around the lower edge of the track, substantially as described.

14. In a door hanger, the combination with a track, of a track wheel, an inverted U-shaped casing wherein said wheel is journaled, a frame carried by said parts and having extended end portions and a door bracket hinged to the end portions of said frame, said casing having a depending guard hook on one side of said rail and said frame having a pair of depending guard lugs at its ends on the other side of said rail, substantially as described.

WILLIAM D. FERRIS.

Witnesses:
LILLIAN PRENTICE,
KATHERINE GERLACH.